(12) United States Patent
Hodgins et al.

(10) Patent No.: US 8,947,441 B2
(45) Date of Patent: Feb. 3, 2015

(54) SYSTEM AND METHOD FOR DATABASE DRIVEN ACTION CAPTURE

(75) Inventors: Jessica Hodgins, Pittsburgh, PA (US); Ronit Slyper, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 799 days.

(21) Appl. No.: 12/802,298

(22) Filed: Jun. 2, 2010

(65) Prior Publication Data

US 2010/0309209 A1 Dec. 9, 2010

Related U.S. Application Data

(60) Provisional application No. 61/217,891, filed on Jun. 5, 2009.

(51) Int. Cl.
*G06T 13/00* (2011.01)
*G06T 13/40* (2011.01)

(52) U.S. Cl.
CPC ........................... *G06T 13/40* (2013.01)
USPC ........................................................ 345/473

(58) Field of Classification Search
None
See application file for complete search history.

(56) References Cited

U.S. PATENT DOCUMENTS

| | | | |
|---|---|---|---|
| 5,615,132 A | 3/1997 | Horton | |
| 5,930,741 A | 7/1999 | Kramer | |
| 6,590,536 B1 | 7/2003 | Walton | |
| 6,691,074 B1 | 2/2004 | Moriya | |
| 7,219,033 B2 | 5/2007 | Kolen | |
| 7,233,872 B2 | 6/2007 | Shibasaki | |
| 2007/0263001 A1 | 11/2007 | Trzecieski | |
| 2008/0278497 A1* | 11/2008 | Jammes et al. | 345/474 |
| 2009/0046056 A1 | 2/2009 | Rosenberg | |
| 2010/0121227 A1 | 5/2010 | Shears et al. | |

FOREIGN PATENT DOCUMENTS

CN 101441776 A 5/2009

OTHER PUBLICATIONS

Okan Arikan. 2006. Compression of motion capture databases. In ACM SIGGRAPH 2006 Papers (SIGGRAPH '06). ACM, New York, NY, USA, 890-897.*

(Continued)

*Primary Examiner* — Daniel Hajnik
(74) *Attorney, Agent, or Firm* — Farjami & Farjami LLP

(57) ABSTRACT

There is provided a system and method for database driven action capture. By utilizing low cost, lightweight MEMS devices such as accelerometers, a user friendly, wearable, and cost effective system for motion capture is provided, which relies on a motion database of previously recorded motions to reconstruct the actions of a user. By relying on the motion database, calculation errors such as integration drift are avoided and the need for complex and expensive positional compensation hardware is avoided. The accelerometers may be implemented in an E-textile embodiment using inexpensive off-the-shelf components. In some embodiments, compression techniques may be used to accelerate linear best match searching against the motion database. Adjacent selected motions may also be blended together for improved reconstruction results and visual rendering quality. Various perceivable effects may be triggered in response to the reconstructed motion, such as animating a 3D avatar, playing sounds, or operating a motor.

20 Claims, 4 Drawing Sheets

(56) References Cited

OTHER PUBLICATIONS

Daniel Vlasic, Rolf Adelsberger, Giovanni Vannucci, John Barnwell, Markus Gross, Wojciech Matusik, and Jovan Popović. 2007. Practical motion capture in everyday surroundings. ACM Trans. Graph. 26, 3, Article 35 (Jul. 2007).*

Jehee Lee, Jinxiang Chai, Paul S. A. Reitsma, Jessica K. Hodgins, and Nancy S. Pollard. 2002. Interactive control of avatars animated with human motion data. In Proceedings of the 29th annual conference on Computer graphics and interactive techniques (SIGGRAPH '02). ACM, New York, NY, USA, 491-500.*

Edmunds, T., et al. "Interactive Character Animation with Vision.", Eurographics/ACM SIGGRAPH Symposium on Computer Animation (2004).*

Ren, Liu, et al. "Learning silhouette features for control of human motion." ACM Transactions on Graphics (ToG) 24.4 (2005): 1303-1331.*

Lorussi, Federico, et al. "Wearable, redundant fabric-based sensor arrays for reconstruction of body segment posture." Sensors Journal, IEEE 4.6 (2004): 807-818.*

Kumar, Mithilesh/Virginia Polytechnic Institute and State University, "A Motion Graph Approach for Interactive 3D Animation using Low-cost Sensors" (Jul. 14, 2008) Retrieved from the internet: <http://scholar.lib.vt.edu/theses/available/etd-07252008-000023/unrestricted/Mithilesh_Kumar_ETD.pdf>.

Xie, Liguang/Virginia Polytechnic Institute and State University, "Realistic Motion Estimation Using Accelerometers" (Jun. 18, 2009) Retrieved from internet: <http://scholar.lib.vt.edu/theses/available/etd-06192009-152207/>.

Xiubo, et al., "Performance-driven motion choreographing with accelerometers/Computer Animation and Virtual Worlds" pp. 89-99 (2009).

Tiesel, et al., "A Moblie Low-Cost Motion Capture System based on Accelerometers" (2006).

Xiubo, et al., "Motion-based Perceptual User Interface" pp. 247-251 (2009).

Xiubo, et al., "Intuitive motion retrieval with motion sensors", (2008) Retrieved from the internet: <http://pronost.nicolas.free.fr/Papers/SensorRetrieval_CGI08.html>.

Schoonderwaldt, et al., "Combining accelerometer and video camera: Reconstruction of bow velocity profiles" (2006) Retrieved from the internet: <http://citeseerx.ist.psu.edu/viewdoc/download?doi=10.1.1.99.6105&rep=rep1&type=pdf>.

* cited by examiner

US 8,947,441 B2

SYSTEM AND METHOD FOR DATABASE DRIVEN ACTION CAPTURE

RELATED APPLICATIONS

This application claims priority to U.S. Provisional Application No. 61/217,891, filed on Jun. 5, 2009, which is hereby incorporated by reference in its entirety.

STATEMENT OF GOVERNMENT INTEREST

This invention was made with Government support under Contract CCF-0702556 and IIS-0326322 awarded by the National Science Foundation (NSF). The Government has certain rights in this invention.

BACKGROUND OF THE INVENTION

1. Field of the Invention

The present invention relates generally to motion capture systems. More particularly, the present invention relates to motion capture systems using motion databases.

2. Background Art

Motion capture can be productively applied to many different fields, including entertainment applications such as video games and movies, medical applications such as physical therapy, monitoring and rehabilitation, physical training applications such as martial arts training, and other areas. In particular, the low cost of MEMS devices such as accelerometers have effectively lowered the barrier of entry for utilizing motion capture. The Wii Remote by Nintendo has provided one visible example harnessing the power of small, lightweight, and low cost accelerometers for capturing the key actions of a video game player.

Unfortunately, the level of motion capture provided by simple devices such as the Wii Remote is insufficient to reproduce detailed coordinated motions of the human body. Since the Wii Remote only provides one point of measurement, it can only track, for example, the hand or arm motions of the user. To retrieve a more detailed range of readings such as for the entire upper body or whole body motion, a more advanced motion capture system is necessary.

One solution is simply to increase the number of accelerometers to provide acceleration readings from several points on a user's body. Unfortunately, with accelerometers alone, it is difficult to accurately calculate the position of the accelerometers for accurate reproduction of user movements. If a straightforward double integration is applied to the acceleration readings to produce positional readings, continual uncorrectable drift inherent in the double integration will skew the positional readings. While solutions to calculating positions have been advanced, including simple solutions such as the infrared "sensor bar" used by the Wii Remote or more advanced solutions such as acoustic-inertial trackers and inertial measurement units (IMUs) using accelerometers, gyroscopes, and magnetic sensors, such solutions are either too simple to provide sufficient positional granularity or too complex and expensive, raising the costs of implementation and thus the barrier to usage. While camera based capture systems exist that can provide accurate positional readings, most of these systems are uncomfortable to use, cumbersome to setup due to complex environmental instrumentation requirements, and prohibitively expensive for general adoption.

Accordingly, there is a need to overcome the drawbacks and deficiencies in the art by providing a cost effective, wearable, and user-friendly motion capture system capable of reproducing a full range of human body motions.

SUMMARY OF THE INVENTION

There are provided systems and methods for database driven action capture, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for database driven action capture. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
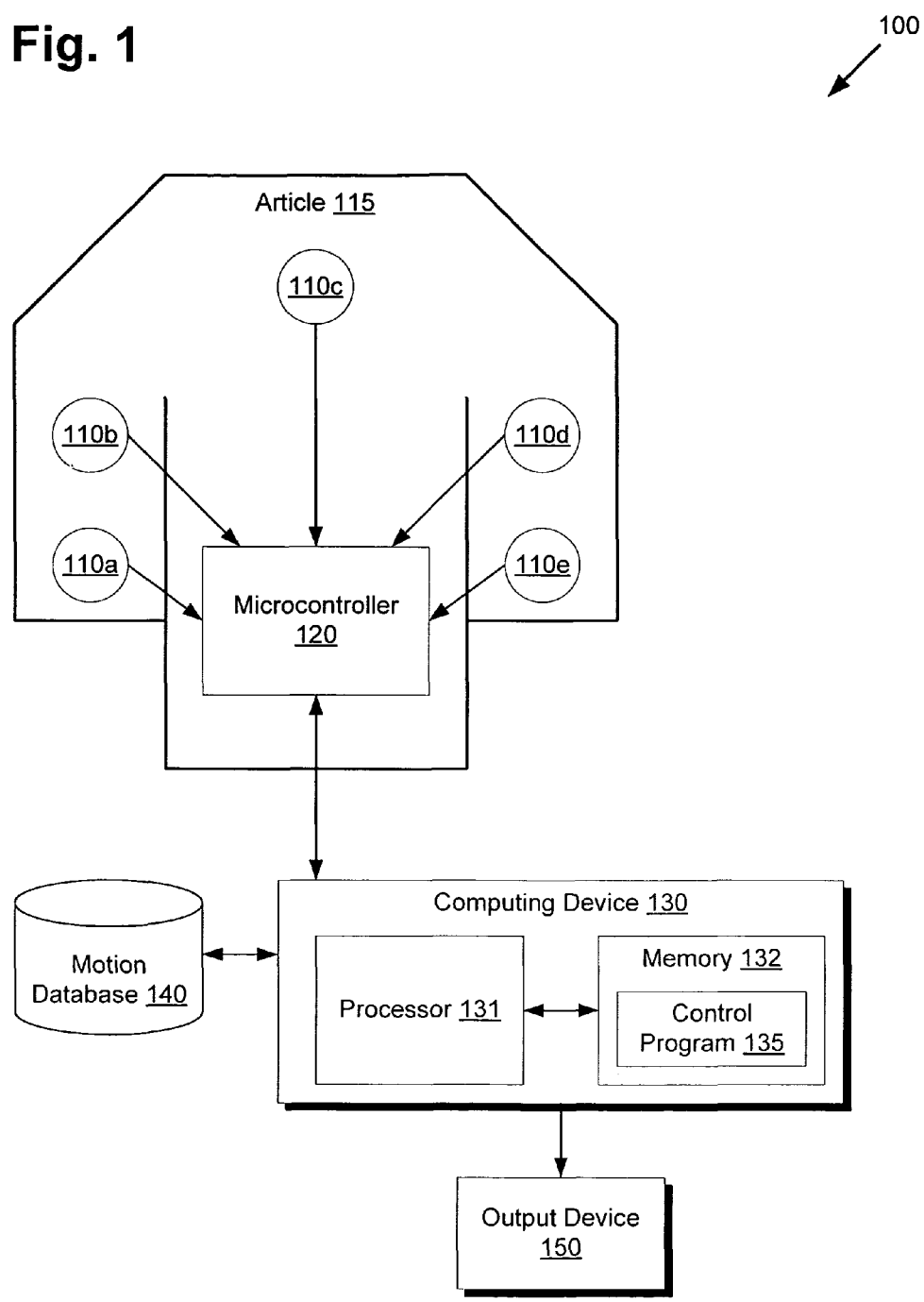
FIG. 1 presents a diagram of a system for implementing database driven action capture, according to one embodiment of the present invention.

FIG. 1 presents a diagram of a system for implementing database driven action capture, according to one embodiment of the present invention. Diagram 100 of FIG. 1 includes article 115, computing device 130, motion database 140, and output device 150. Article 115 includes motion sensing devices 110a through 110e and microcontroller 120. Computing device 130 includes processor 131 and memory 132. Memory 132 includes control program 135.

As shown in diagram 100 of FIG. 1, the motion sensing devices 110a through 110e may be placed on key body positions of article 115, which may for example comprise a comfortable shirt or other article of clothing. In alternative embodiments, article 115 may comprise a full body suit, or motion sensing devices 110a through 110e may be placed directly on existing clothing or skin of a user. Moreover, while FIG. 1 shows five motion sensing devices corresponding to the user's left and right forearms, left and right upper arms, and chest, alternative embodiments may include different quantities of motion sensing devices and may correspond to different parts of the user's body. As shown in FIG. 1, motion sensing devices 110a through 110e communicate by wired connections to microcontroller 120, which in turn is in communication with computing device 130. In alternative embodiments, motion sensing devices 110a through 110e may communicate wirelessly to microcontroller 120 or directly to computing device 130. Microcontroller 120 may communicate with computing device 130 through direct connect cable, such as by USB cable, or by wireless communication, such as by Bluetooth.

Motion sensing devices 110a through 110e may each comprise, for example, a small and lightweight three axis accelerometer, such as the LilyPad Accelerometer ADXL335, SKU DEV-09267 available from SparkFun Electronics. Prior to usage, the accelerometers may be calibrated by pointing upwards and downwards to register ±1 g and derive the scaling factor per g and zero-g values. Microcontroller 120 may comprise, for example, hardware based on the popular Arduino prototyping platform, such as the USB based Arduino Main Board, SKU DEV-00666 also available from SparkFun Electronics. In this case, microcontroller 120 communicates with computing device 130 using a standard USB cable, however wireless operation may be enabled by substituting microcontroller 120 with a board having wireless functionality such as Bluetooth. Conductive thread, such as those provided in the LilyPad E-sewing kit, may be used to provide wired connections between motion sensing devices 110a through 110e and microcontroller 120. The conductive traces may be sewn to minimize crossings and be coated with fabric paint to reduce erosion when washing and to prevent electrical shorts. Alternatively, as discussed above, wireless connections may be utilized. Thus, a user-friendly implementation of database driven action capture can be provided using a comfortable and lightweight motion capture shirt. If microcontroller 120 is made detachable from article 115 or is otherwise protected, then article 115 may also be easily washable.

It should be noted that the e-textile embodiment shown in FIG. 1 is only one particular non-limiting embodiment. Alternative embodiments may, for example, use different motion detection systems instead of e-textile based accelerometers. One alternative embodiment may use triangulation of radio frequency identification (RFID) tags as the motion sensing devices to detect movement. Another alternative embodiment may use cameras placed in the environment of the user to capture images and detect movement based on image analysis. Yet another alternative embodiment may use a Light Detection and Ranging (LIDAR) system for motion detection. Still another alternative embodiment may use sensors based on the heterodyne principle, the effect behind a performance of a theremin. In general, any system of motion detection may be utilized, but certain systems may be more appropriate for cost sensitive applications.

Computing device 130 may comprise a standard desktop, laptop, or tablet computer, a gaming console, a mobile device, a server or workstation computer, a mobile phone, or any other computing device. Output device 150 may comprise any device capable of generating perceptible effects. In many embodiments, output device 150 may comprise a display such as a LCD monitor for visual feedback, for example to render a reconstructed motion from motion capture of a user to animate a user avatar or a 3D human model. However, alternative embodiments may use other types of sensory output devices, such as a speaker for audio feedback playing chimes, alerts, or voice guidance, or a motor for providing haptic or force feedback. Output device 150 may also be integrated into computing device 130, for example as a display of a laptop computer. Alternatively, output device 150 may be placed in a remote location and in communication with computing device 130 using a network or wireless connection, for example to implement remote monitoring of patient movements for hospital staff. Thus, several computing devices may output to the same output device.

Motion database 140 may include a large dataset of pre-recorded human motions, including positional data and acceleration data, captured using an advanced motion capture system such as commercially available motion capture systems from Vicon. If only specific motions are desirable, then motion database 140 may be restricted to contain only those specific motions. This may be particularly advantageous for gaming applications where the game program code may be configured to implement only specific avatar motions, physical therapy and monitoring applications where only specific body motions are of interest, and other applications working with well defined motion sets. Advantageously, limiting the scope of motion database 140 to only a limited subset of possible human motions may also reduce the chances of false matching positives by reducing the number of different motions having similar acceleration profiles. Furthermore, database lookups may execute more quickly with fewer records, thus requiring less processing resources. A more detailed example composition of motion database 140 will be discussed in greater detail below in conjunction with FIG. 3.

Since the hardware components depicted in FIG. 1 may be sourced using inexpensive off-the-shelf components, a complete implementation of database driven action capture may be accomplished in a very cost effective manner. For example, a prototype motion capture shirt corresponding to article 115 in FIG. 1 was successfully built at the cost of approximately $200 USD. Computing device 130 may comprise any personal computer such as a low cost netbook, typically costing approximately $300 USD. In this case, output device 150, or the LCD display, is already integrated into computing device 130. While the generation of motion database 140 may require significant motion capture resources, a pre-generated motion database 140 may be made accessible to the public using non-commercial, low-cost, or free usage licenses.

Diagram 100 of FIG. 1 provides a high level overview of how an exemplary database driven action capture system may be implemented. Microcontroller 120 may execute a simple code loop periodically polling motion sensing devices 110a through 110e. For example, if motion sensing devices 110a through 110e comprise three axis accelerometers, microcontroller 120 may be configured to read, at a rate of 120 times per second, analog-to-digital acceleration readings from each axis of each accelerometer fed into a mux. The polling rate may be adjusted higher or lower depending on the desired data granularity, motion smoothness, and available processing resources. The motion data of acceleration readings may then be passed to computing device 130 for further processing.

More specifically, processor 131 of computing device 130 may execute control program 135 in memory 132 to match the incoming motion data to the closest available pre-recorded motions contained within motion database 140. Advantageously, by using database matching to recorded movements rather than attempting to directly calculate position, skew error inherent from double integration of acceleration readings is avoided, and the need for expensive and complex compensation hardware is also avoided. The matched motion may then be applied to a three-dimensional model to recreate the motion in a rendered animation on output device 150, which may comprise a display. As discussed above, alternative embodiments may use other devices for output device 150. For example, in one embodiment, by configuring motion database 140 with specific motions for physical therapy, a patient wearing article 115 may receive audible voice feedback from output device 150 comprising a speaker, encouraging the patient if the detected motions closely match those in the database or providing suggestions for adjustments if the motions do not closely match.

Figure 2:
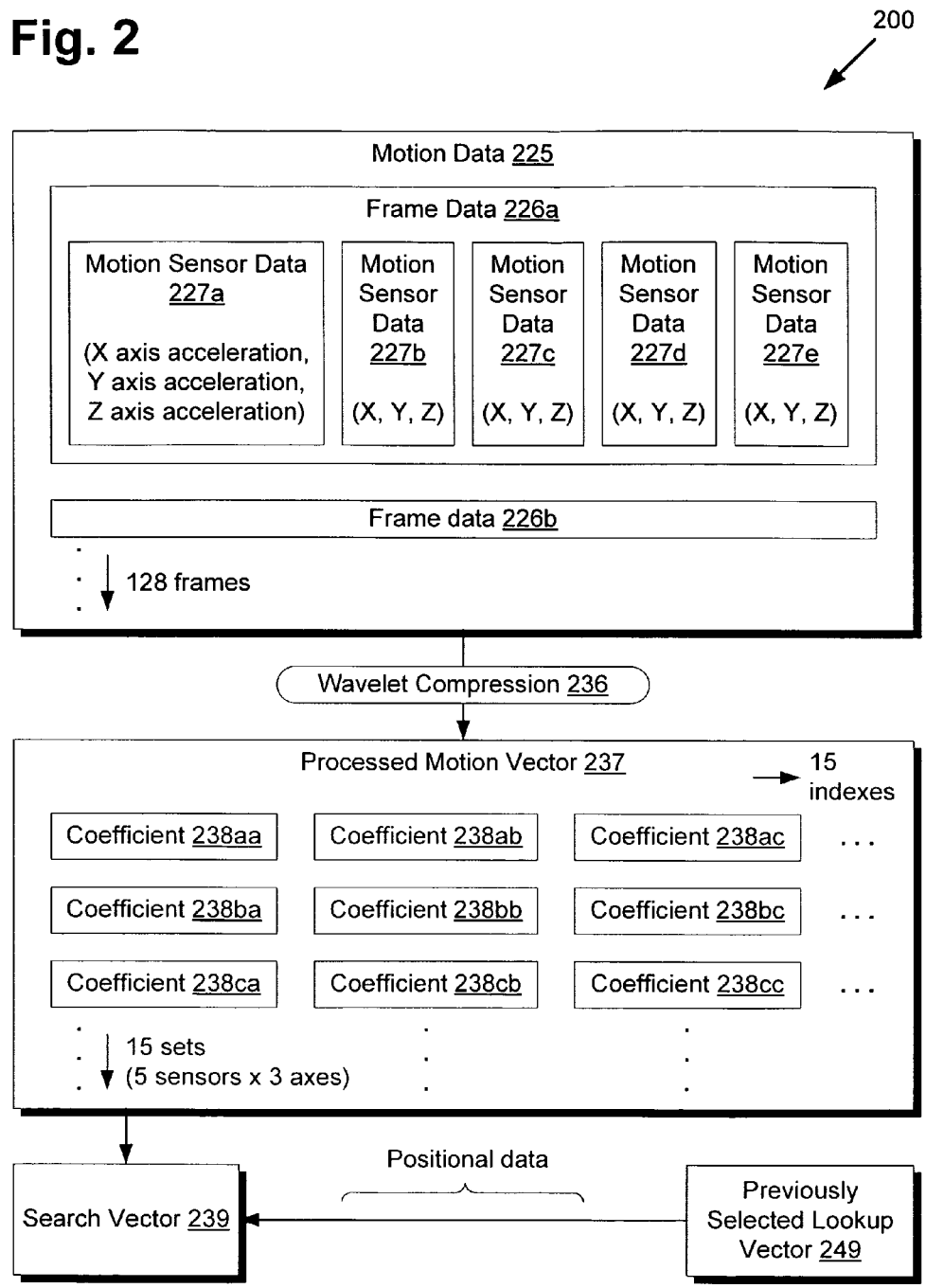
FIG. 2 presents a data flow diagram for processing motion data received from motion sensors to implement database driven action capture, according to one embodiment of the present invention.

Moving to FIG. 2, FIG. 2 presents a data flow diagram for processing motion data received from motion sensors to implement database driven action capture, according to one embodiment of the present invention. Diagram 200 of FIG. 2 includes motion data 225, wavelet compression 236, processed motion vector 237, search vector 239, and previously selected lookup vector 249. Motion data 225 includes frame data 226a, frame data 226b, and other frame data (omitted in FIG. 2) to total 128 frames. Processed motion vector 237 includes coefficients 238aa, 238ab, 238ac, 238ba, 238bb, 238bc, 238ca, 238cb, 238cc, and other coefficients (omitted in FIG. 2) to total 15 by 15 or 225 coefficients.

Referring back to FIG. 1, motion data 225 may be received by computing device 130 from motion sensing devices 110a through 110e via microcontroller 120. For example, processor 131 of computing device 130 may store motion data 225 by reserving a data buffer in memory, such as memory 132, which is updated by values received from microcontroller 120. As shown in FIG. 2, motion data 225 is configured to store 128 frames worth of data, but alternative embodiments may use different buffer sizes. As discussed above, since microcontroller 120 may be configured to poll approximately 120 times per second, 128 frames equal approximately 1 second worth of data. The number 128 was selected based on trial and error. Smaller numbers lost the context of the user action, whereas larger numbers limited the feasibility of using a database search, unless requencing or interpolation was used to broaden the database.

As shown in frame data 226a, each frame includes motion sensor data corresponding to each motion sensing device. Thus, referring to FIG. 1, motion sensor data 227a may correspond to motion sensing device 110a, motion sensor data 227b may correspond to motion sensing device 110b, motion sensor data 227c may correspond to motion sensing device 110c, motion sensor data 227d may correspond to motion sensing device 110d, and motion sensor data 227e may correspond to motion sensing device 110e. As shown in motion sensor data 227a through 227e, the acceleration values for each of the three axes X, Y and Z are recorded. Each of the remaining 127 frames, including frame data 226b, may have a data structure similar to frame data 226a. For the purposes of explanation, it may be assumed that motion data 225 contains data for readings most recent in time, but excluding the present time. Thus, ignoring processing time lag and other factors, the final frame of motion data 225 may be assumed to occur one frame in time prior to the present time, or at 120 frames per second, $1/120^{th}$ of a second prior to the present time. In an actual implementation, motion data 225 may be structured as a ring buffer.

Prior to using motion data 225 in an application, motion sensing devices 110a-110e may be pre-calibrated to better match the movements of a specific user, for example by displaying an example motion on output device 150 comprising a display and requesting the user to repeat the same example motion. In this manner, manual or automatic calibration may be carried out for individual motion sensing devices or all motion sensing devices at once. Since only a single human subject may provide the data recorded in motion database 140, this calibration step may provide better matched results for a wider range of users that may have differing movement patterns and body composition compared to the single human subject. Alternatively or additionally, motion database 140 may contain profiles for several different body types and genders.

At defined time intervals, motion data 225 may be processed to generate a search vector 239 for querying using motion database 140 in FIG. 1. In one specific embodiment, the time interval is defined to be approximately 0.083 seconds, or every 10 frames assuming a polling rate of 120 frames per second. The time interval of approximately 0.083 seconds was chosen based on trial and error and the processing time to conduct the database query, or approximately 0.060 seconds on a 2.33 GHz MacBook Pro by Apple. A smaller interval with more frequent motion matching resulted in jerkiness due to more frequent changing of motions, whereas a longer interval with less frequent motion matching resulted in unacceptably high latency. The time interval of approximately 0.083 seconds provides reasonable reaction time to user actions while providing sufficient buffer time for the smooth blending of adjacent search motion results, a key parameter in reconstructing smooth movements.

As shown in FIG. 2, search vector 239 includes processed motion vector 237 and previously selected lookup vector 249. Processed motion vector 237 is created at the defined time intervals described above by applying wavelet compression 236 to motion data 225. Since each frame of data in motion data 225 contains data for 5 motion sensors and 3 axes, 15 sets of coefficients result, as shown in FIG. 2. Thus, for example, the row of coefficients 238aa, 238ab, 238ac and so forth may correspond to the X axis of motion sensing device 110a, the row of coefficients 238ba, 238bb, 238bc and so forth may correspond to the Y axis of motion sensing device 110a, and the row of coefficients 238ca, 238cb, 238cc and so forth may correspond to the Z axis of motion sensing device 110a. The sets of coefficients continue for each of the three axes of the remaining motion sensing devices 110b through 110e, as indicated in FIG. 2.

Figure 3:
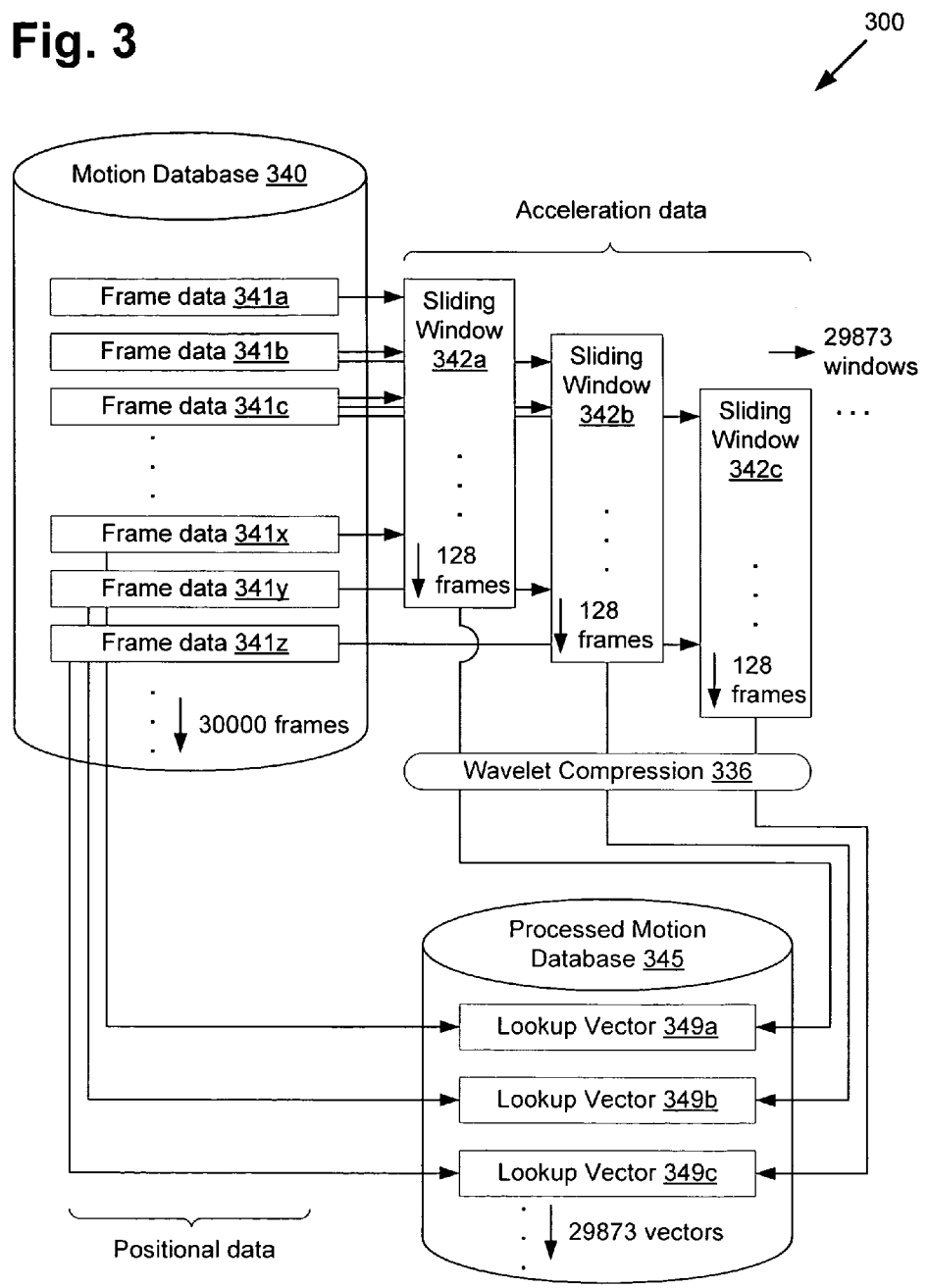
FIG. 3 presents a data flow diagram for processing a motion database for use in database driven action capture, according to one embodiment of the present invention.

As is known in the art, wavelet compression algorithms can provide significant data compression ratios while reconstructing a very good approximation of the original data signal, which explains their widespread adoption in audio, image, and video compression. Wavelet compression 236 may, for example, implement a Haar wavelet transform, preserving only the 15 most significant coefficients for each set and discarding the rest. Thus, as shown in FIG. 3, each row of coefficients only contains 15 indexes. The number 15, or approximately 10% the size of the original 128 value data block, was chosen based on trial and error, as a larger number of preserved coefficients did not noticeably improve the search results. Since the number of data values is thereby reduced from 128 values to 15 values for each set, the data is compressed to approximately 10% of its original size, thereby accelerating a linear search through motion database 140 accordingly, assuming that motion database 140 is also pre-processed using the same wavelet compression 236. In this manner, a fast and simple best match linear search through motion database 140 can be utilized. For larger datasets, more sophisticated search methods such as non-linear searches may be utilized to reduce the search time. Additionally, in alternative embodiments, wavelet compression 236 may be replaced with other compression algorithms or transforms, for example by using a principal components analysis (PCA) transformation.

Processed motion vector 237 only provides data derived from accelerations. As such, if processed motion vector 237 is solely used as search vector 239, then the context of the sensor positioning is lost, allowing matches to motions having very different sensor positions but similar acceleration profiles. Thus, as shown in FIG. 2, positional data from previously selected lookup vector 249 is also appended to search vector 239. More specifically, the sensor positions from the final frame of the previously selected lookup vector may be utilized, and may be weighted to count for approximately 10% of the search metric, with the remaining 90% coming from processed motion vector 237. This additional metric enforces positional continuity between successive selected motions, and may be adjusted up or down from the selected 10%. Thus, search vector 239 can be compared against similarly preprocessed vectors from motion database 140 using the $L^2$ norm.

Moving to FIG. 3, FIG. 3 presents a data flow diagram for processing a motion database for use in database driven action capture, according to one embodiment of the present invention. Diagram 300 of FIG. 3 includes motion database 340, sliding windows 342a through 342c and other sliding windows (omitted in FIG. 3) to total 29873 windows, wavelet compression 336, and processed motion database 345. Motion database 340 includes frame data 341a, 341b, 341c, 341x, 341y, 341z, and other frame data (omitted in FIG. 3) to total 30,000 frames. Processed motion database 345 includes lookup vectors 349a, 349b, 349c, and other vectors (omitted in FIG. 3) to total 29873 vectors. In FIG. 3, wavelet compression 336 may correspond to wavelet compression 236 from FIG. 2 and motion database 340 may correspond to motion database 140 from FIG. 1.

As shown in FIG. 3, motion database 340 may contain a large dataset of frames, such as 30,000 frames, corresponding to motions captured from a human model. Assuming a frame rate of 120 frames per second, this corresponds to approximately 4 minutes of continuous motion readings. As previously discussed, a commercial motion capture system such as those available from Vicon may be used to create motion database 340. The human model may be instructed to perform specific movements appropriate for the application to be implemented. Frame data 341a, 341b, 341c, 341x, 341y, 341z, and the remaining frames of the 30,000 frames may each contain, for example, positional and acceleration data for several different points of the model's body. For simplicity, it may be assumed that only five points are measured, corresponding to the five points shown by motion sensing devices 110a through 110e in FIG. 1. However, alternative embodiments may include more or less points of measurement. If more points of measurement are provided than sensors available on article 115, matching operations may interpolate values for the missing sensors or simply ignore the extra measurements. Similarly, if less points of measurement are provided than sensors available on article 115, the extra values may be discarded or factored into the other values.

As shown in FIG. 3, the first step of converting motion database 340 to processed motion database 345 is generating a set of sliding data windows containing acceleration data. Thus, sliding windows 342a through 342c are shown, containing the accelerations from corresponding frames in motion database 340 as indicated by the arrows. Thus, for example, sliding window 342a contains accelerations from frame data 341a, 341b, 341c, and 341x. Thus, frame data 341a may be assumed to be the $1^{st}$ frame of motion, frame data 341b the $2^{nd}$ frame of motion, frame data 341c the $3^{rd}$ frame of motion, frame data 341x the $128^{th}$ frame of motion, frame data 341y the $129^{th}$ frame of motion, and frame data 341z the $130^{th}$ frame of motion. Each sliding window contains 128 frames of acceleration data to match the buffer size selected for motion data 225 in FIG. 2. As shown in FIG. 3, sliding windows are continually generated until the 30,000 frames are exhausted, resulting in 30,000−128+1 or 29,873 windows.

After the sliding windows are generated, wavelet compression 336 is applied to all of the sliding windows, similar to the process shown by wavelet compression 236 in FIG. 2. As previously described, alternative compression algorithms may be substituted for wavelet compression. Additionally, positional data from the final frame of each sliding window is appended to each result to form a lookup vector, similar to the appending of previously selected lookup vector 249 to search vector 239 in FIG. 2. Thus, the final result is the 29873 vectors stored in processed motion database 345, including lookup vectors 349a through 349c as shown in FIG. 3. Processed motion database 345 may then be stored in memory 132 of FIG. 1 for access by control program 135, allowing fast linear best match searches to be conducted for search vector 239 in FIG. 2.

Figure 4:
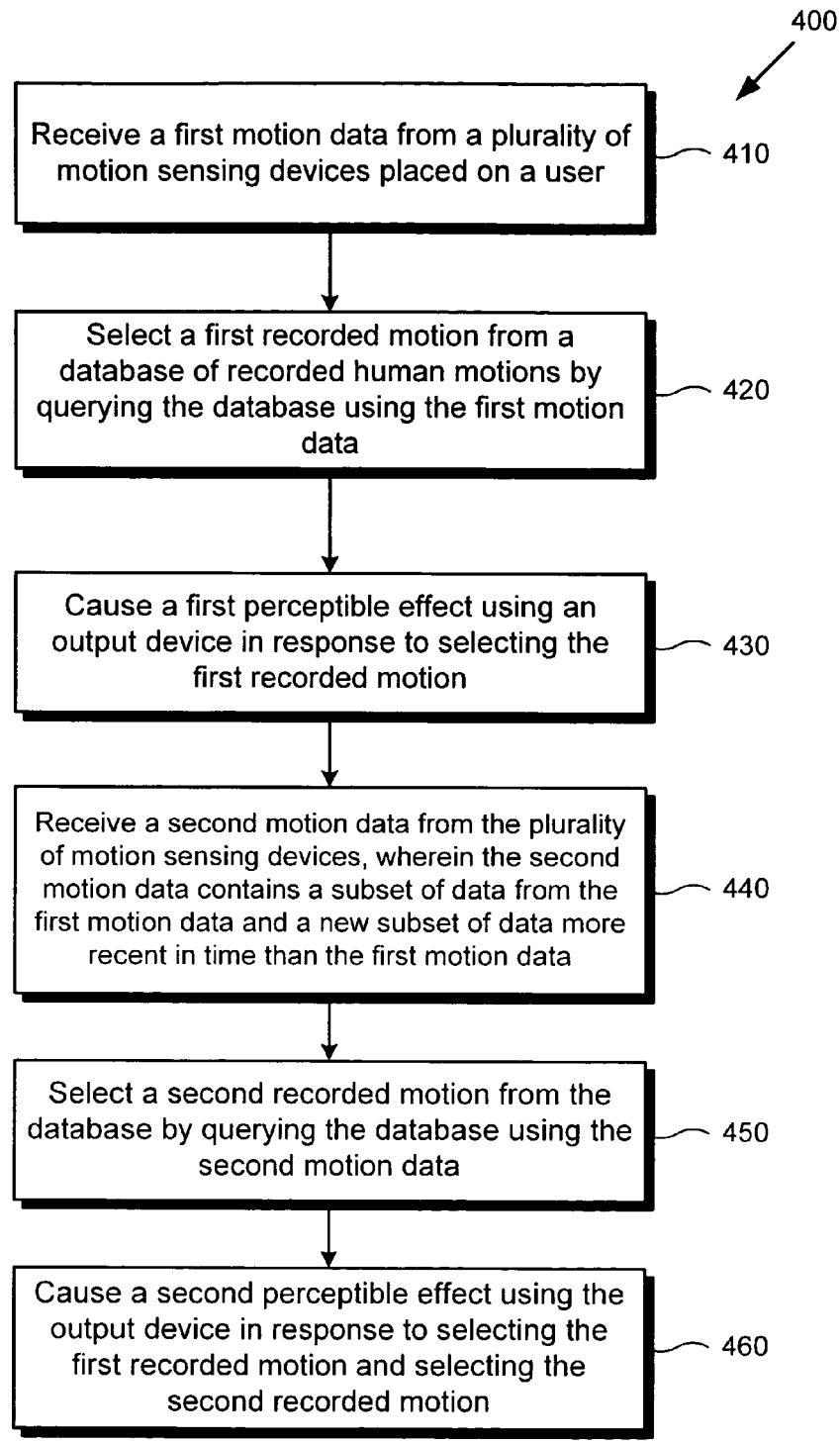
FIG. 4 shows a flowchart describing the steps, according to one embodiment of the present invention, by which a processor of a processing system can implement database driven action capture.

Moving to FIG. 4, FIG. 4 shows a flowchart describing the steps, according to one embodiment of the present invention, by which a processor of a processing system can implement database driven action capture. Certain details and features have been left out of flowchart 400 that are apparent to a person of ordinary skill in the art. For example, a step may comprise one or more substeps or may involve specialized equipment or materials, as known in the art. While steps 410 through 460 indicated in flowchart 400 are sufficient to describe one embodiment of the present invention, other embodiments of the invention may utilize steps different from those shown in flowchart 400.

Referring to step 410 of flowchart 400 in FIG. 4, diagram 100 of FIG. 1, and diagram 200 of FIG. 2, step 410 of flowchart 400 comprises processor 131 of computing device 130 receiving motion data 225 from motion sensing devices 110a through 110e placed on a user. As shown in FIG. 1, motion sensing devices 110a through 110e may be placed on the user through article 115, which may comprise a shirt or other piece of clothing. Microcontroller 120 may poll motion sensing devices 110a through 110e to provide motion data 225 to processor 131. Alternatively, as previously discussed, each motion sensing device may communicate with processor 131 directly without microcontroller 120, such as through wireless data transmission.

Referring to step 420 of flowchart 400 in FIG. 4, diagram 100 of FIG. 1, and diagram 200 of FIG. 2, step 420 of flowchart 400 comprises processor 131 of computing device 130 selecting a first recorded motion from database 140 by querying the database using motion data 225 received from step 410. As previously discussed, wavelet or other compression techniques may be utilized to enable fast best match linear searching, in which case processed motion database 345 may be used for the database. Positional data from a prior selected match, such as previously selected lookup vector 249, may also be used as a search metric to enforce positional continuity, as described.

Referring to step 430 of flowchart 400 in FIG. 4 and diagram 100 of FIG. 1, step 430 of flowchart 400 comprises processor 131 of computing device 130 causing a first perceptible effect using output device 150 in response to step 420. Since the aim is to reproduce the movements of the user as detected in step 410, this first perceptible effect may be generally described as a variation of the first recorded motion from step 420 modulated according to motion data 225 received from step 410. As previously discussed, in many embodiments the first perceptible effect may comprise a render using the first recorded motion selected from step 420 to animate an avatar or 3D human model on output device 150 comprising a display, but alternative embodiments may provide audio, haptic, or other feedback through alternative output devices.

In some embodiments, the process may simply stop after step 430 or loop back to step 410, particularly if output device 150 does not provide visual feedback. However, in instances where output device 150 comprises a display, it is desirable to regenerate smoother motion for higher quality visual results. In this case, some embodiments may continue to implement steps 440 through 460, which provide smoothing between adjacent selected recorded motions.

Referring to step 440 of flowchart 400 in FIG. 4, diagram 100 of FIG. 1, and diagram 200 of FIG. 2, step 440 of flowchart 400 comprises processor 131 of computing device 130 receiving a second, updated motion data 225 from motion sensing devices 110a through 110e placed on the user, wherein the updated motion data 225 contains a subset of data from the old motion data 225 received from step 410 and a new subset of data more recent in time than the old motion data 225 received from step 410. In other words, a period of time has passed between step 410 and step 440 such that motion data 225 is populated with more recent frame data, but not enough data to completely overwrite the older frame data. As previously discussed, the time period between step 410 and step 440 may be configured to be approximately 0.083 seconds, wherein the updated motion data 225 would contain 10 new frames of data. Otherwise, step 440 may be carried out similarly to step 410.

Referring to step 450 of flowchart 400 in FIG. 4, diagram 100 of FIG. 1, and diagram 200 of FIG. 2, step 450 of flowchart 400 comprises processor 131 of computing device 130 selecting a second recorded motion from database 140 by querying the database using the second updated motion data 225 received from step 440. At this point, the first recorded motion selected from step 420 may become the previously selected lookup vector 249 in FIG. 2. Step 450 may be carried out similarly to step 420. In particular, positional data from the final frame of the second recorded motion may be matched to the corresponding frame in the first recorded motion as a search metric for positional continuity.

Referring to step 460 of flowchart 400 in FIG. 4 and diagram 100 of FIG. 1, step 460 of flowchart 400 comprises processor 131 of computing device 130 causing a second perceptible effect using output device 150 in response to steps 420 and 450. In the case of a visually perceptible effect, the second perceptible effect may be a smooth blending shown on the display between the old first recorded motion selected in step 420 and the new second recorded motion selected in step 450. Thus, for example, assuming the 10 frame delay between steps 410 and 440 as described above, the rendering of old motion may be blended with the last 10 frames of the new motion. Assuming a continuing cycle of steps similar to steps 440 through 460 for further motion data, newly selected motions will continue to be blended together, helping to prevent sudden jerky movements and improving the smoothness of the reconstruction and thus the visual quality of the final result.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for translating motions of a user into perceptible effects, the method comprising:
   receiving a first motion data from a plurality of motion sensing devices based on detecting the motions of the user;
   converting the first motion data to a first processed motion data, wherein the converting includes generating a first set of sliding data windows containing a first acceleration data corresponding to the first motion data;
   selecting a first recorded motion from a database of recorded human motions by querying the database using the first processed motion data;
   causing a first perceptible effect in response to selecting the first recorded motion;
   receiving a second motion data from the plurality of motion sensing devices, wherein the second motion data contains a first subset of data from the first motion data and a second subset of data more recent in time than, the first motion data;
   converting the second motion data to a second processed motion data, wherein the converting includes generating a second set of sliding data windows containing a second acceleration data corresponding to the second motion data;
   selecting a second recorded motion from the database by querying the database using the second processed motion data, wherein the first subset of data is given less weight than the second subset of data when selecting a second recorded motion; and
   causing a second perceptible effect in response to selecting the first recorded motion and selecting the second recorded motion.

2. The method of claim 1, wherein querying the database using the first motion data includes applying a compression algorithm to the first motion data.

3. The method of claim 1, wherein the first perceptible effect comprises rendering the first recorded motion on a display.

4. The method of claim 2, wherein the second perceptible effect comprises rendering a smooth blending between the first recorded motion and the second recorded motion on a display.

5. The method of claim 1, wherein querying the database further includes conducting a search using the database preprocessed with the compression algorithm.

6. The method of claim 5, wherein the search comprises a linear best match search, and wherein the compression algorithm comprises a Haar wavelet transform preserving approximately 10% of the most significant coefficients from the transform.

7. The method of claim 4, wherein the querying the database using the second motion data includes applying the compression algorithm to the second motion data and conducting a search using the database preprocessed with the compression algorithm, wherein the search further matches positional data from a final frame of the second recorded motion to positional data from a corresponding frame of the first recorded motion.

8. The method of claim 1, wherein the plurality of motion sensing devices are placed on the user by attachment to an article of clothing worn by the user, wherein conductive traces connect two or more of the plurality of motion sensing devices, and wherein the conductive traces are sewn to the article of clothing and are coated with fabric paint.

9. The method of claim 1, wherein the plurality of motion sensing devices is one of accelerometers, triangulated ultrasonic tags, cameras, a Light Detection and Ranging (LIDAR) system, and sensors based on the heterodyne principle.

10. The method of claim 1, wherein the first perceptible effect is a variation of the first recorded motion modulated according to the first motion data.

11. A system for translating motions of a user into perceptible effects, the system comprising:
a plurality of motion sensing devices configured to detect the motions of the user;
a database of recorded human motions;
an output device configured to generate the perceptible effects; and
a computing device having a processor configured to:
receive a first motion data from the plurality of motion sensing devices based on detecting the motions of the user;
convert the first motion data to a first processed motion data wherein the converting includes generating a first set of sliding data windows containing a first acceleration data corresponding to the first motion data;
select a first recorded motion from the database by querying the database using the first processed motion data;
cause a first perceptible effect using the output device in response to selecting the first recorded motion;
receive a second motion data from the plurality of motion sensing devices, wherein the second motion data contains a first subset of data from the first motion data and a second subset of data more recent in time than the first motion data;
convert the second motion data to a second processed motion data, wherein the converting includes generating a second set of sliding data windows containing a second acceleration data corresponding to the second motion data;
select a second recorded motion from the database by querying the database using the second processed motion data, wherein the first subset of data is given less weight than the second subset of data when selecting a second recorded motion; and
cause a second perceptible effect using the output device in response to selecting the first recorded motion and selecting the second recorded motion.

12. The system of claim 11, wherein querying the database using the first motion data includes applying a compression algorithm to the first motion data.

13. The system of claim 11, wherein the output device comprises a display, and wherein the first perceptible effect comprises rendering the first recorded motion on the output device.

14. The system of claim 12, wherein the output device comprises a display, and wherein the second perceptible effect comprises rendering a smooth blending between the first recorded motion and the second recorded motion on a display.

15. The system of claim 11, wherein the processor of the computing device is further configured to conduct a search using the database preprocessed with the compression algorithm.

16. The system of claim 15, wherein the search comprises a linear best match search, and wherein the compression algorithm comprises a Haar wavelet transform preserving approximately 10% of the most significant coefficients from the transform.

17. The system of claim 14, wherein the processor of the computing device is further configured to query the database using the second motion data by applying the compression algorithm to the second motion data and conducting a search using the database preprocessed with the compression algorithm, wherein the search further matches positional data from a final frame of the second recorded motion to positional data from a corresponding frame of the first recorded motion.

18. The system of claim 11, wherein the plurality of motion sensing devices are placed on the user by attachment to an article of clothing worn by the user, wherein conductive traces connect two or more of the plurality of motion sensing devices, and wherein the conductive traces are sewn to the article of clothing and are coated with fabric paint.

19. The system of claim 11, wherein the plurality of motion sensing devices is one of accelerometers, triangulated ultrasonic tags, cameras, a Light Detection and Ranging (LIDAR) system, and sensors based on the heterodyne principle.

20. The system of claim 11, wherein the first perceptible effect is a variation of the first recorded motion modulated according to the first motion data.

* * * * *